United States Patent
Moro et al.

(10) Patent No.: US 8,742,027 B2
(45) Date of Patent: Jun. 3, 2014

(54) METHOD FOR MAKING COMB POLYMERS BY DRYING THEN FUNCTIONALIZATION OF THE METH(ACRYLIC)POLYMER BACKBONE, RESULTING POLYMERS AND USES THEREOF

(75) Inventors: Jean Moro, Toussieux (FR); Jean-Marc Suau, Lucenay (FR); Yves Kensicher, Theize (FR)

(73) Assignee: Coatex, Genay (FR)

( * ) Notice: Subject to any disclaimer, the term of this patent is extended or adjusted under 35 U.S.C. 154(b) by 816 days.

(21) Appl. No.: 12/299,972

(22) PCT Filed: May 4, 2007

(86) PCT No.: PCT/IB2007/001219
§ 371 (c)(1),
(2), (4) Date: Nov. 7, 2008

(87) PCT Pub. No.: WO2007/132322
PCT Pub. Date: Nov. 22, 2007

(65) Prior Publication Data
US 2009/0182061 A1 Jul. 16, 2009

(30) Foreign Application Priority Data
May 12, 2006 (FR) ...................................... 06 04212

(51) Int. Cl.
*C08F 8/14* (2006.01)
*C08F 20/06* (2006.01)

(52) U.S. Cl.
USPC ...................... 525/330.1; 525/329.5; 524/556

(58) Field of Classification Search
USPC .............................. 525/330.1, 329.5; 524/556
See application file for complete search history.

(56) References Cited

U.S. PATENT DOCUMENTS

| 3,933,943 A | | 1/1976 | Fahrbach et al. |
| 4,892,932 A | * | 1/1990 | Rauch et al. ................... 528/499 |
| 5,728,207 A | * | 3/1998 | Arfaei et al. ................... 106/709 |
| 6,573,316 B1 | * | 6/2003 | Albrecht et al. ................. 524/96 |
| 6,673,885 B1 | * | 1/2004 | Shibata et al. ............ 526/318.41 |
| 6,846,882 B2 | * | 1/2005 | Kroner et al. ............... 525/330.1 |
| 2002/0111429 A1 | | 8/2002 | Yasumura et al. |
| 2002/0156220 A1 | | 10/2002 | Meyer et al. |
| 2006/0004148 A1 | | 1/2006 | Sulser et al. |
| 2006/0030670 A1 | * | 2/2006 | Lee et al. ....................... 525/242 |
| 2008/0119602 A1 | | 5/2008 | Sulser et al. |
| 2010/0273923 A1 | * | 10/2010 | Suau et al. .................... 524/145 |

FOREIGN PATENT DOCUMENTS

| EP | 0 734 763 B1 | 10/1996 |
| FR | 2 204 640 | 5/1974 |
| JP | 7-10943 | 1/1995 |
| JP | 9-87319 | 3/1997 |
| JP | 2005-520900 | 7/2005 |
| WO | 02 066529 | 8/2002 |

OTHER PUBLICATIONS http://www.sigmaaldrich.com/catalog/ProductDetail.do?D7=0&N5=SEARCH_CONCAT_PNO%7CBRAND_KEY&N4=81318%7CFLUKA&N25=0&QS=ON&F=SPEC, 2011.*
U.S. Appl. No. 12/811,959, filed Jul. 7, 2010, Suau, et al.
Office Action issued Oct. 25, 2011 in Japan Application No. 2009-508540 (English Translation).

* cited by examiner

*Primary Examiner* — Satya Sastri
(74) *Attorney, Agent, or Firm* — Oblon, Spivak, McClelland, Maier & Neustadt, L.L.P.

(57) ABSTRACT

The present invention relates to processes for manufacturing comb polymers having a principal (meth)acrylic chain and polyoxyalkylated lateral groupings, obtained by drying of a solution containing at least one homopolymer of (meth)acrylic acid and/or at least one copolymer of (meth)acrylic acid with at least one other monomer, followed by functionalisation of the intermediate dry product by esterification with at least one alkoxy polyoxyalkylene glycol, and/or amidification with at least one alkoxy polyoxyalkylene amine, or ethoxylation with at least one alkylene oxide.

15 Claims, No Drawings

METHOD FOR MAKING COMB POLYMERS BY DRYING THEN FUNCTIONALIZATION OF THE METH(ACRYLIC)POLYMER BACKBONE, RESULTING POLYMERS AND USES THEREOF

CROSS REFERENCE TO RELATED APPLICATION

This application is a 371 of PCT/IB07/001219, filed on May 4, 2007, and claims priority to French Patent Application No. 06 04212, filed on May 12, 2006.

The present invention concerns the technical sector of "comb" polymers, used in formulations containing mineral or organic matter, where the said formulations are either plastics containing mineral or organic matter, or aqueous formulations containing mineral or organic matter, and which are then aqueous dispersions and suspensions of mineral or organic matter, aqueous compositions with hydraulic binder bases, containing mineral or organic matter, such as concretes, mortars, slags, cement slips or plasters, but also paints, paper coatings, cosmetic formulations and detergent formulations.

The skilled man in the art who is a formulator of polymers designates with the expression "comb" those polymers the structure of which, similar to that of a comb, has a principal chain to which are attached lateral chains which can be of different natures and lengths.

For many years it has been well known that "comb" polymers, notably having a principal chain of a (meth)acrylic nature, to which are attached polyoxyalkylated lateral groupings, can give compositions with hydraulic binder bases, and containing mineral or organic matter in which they are incorporated, advantageous properties in terms of fluidity, workability, or again in terms of reduction of their water content.

The skilled man in the art is currently familiar with 4 methods of preparing these comb polymers:

copolymerisation, in the presence of organic solvents, of maleic anhydride with another hydrophobic monomer, such as, notably, styrene, followed by possible drying of the copolymer obtained, followed by its functionalisation by alkoxy polyoxyalkylene glycol or alkoxy polyoxyalkylene amine groupings, copolymerisation in aqueous solution or in the presence of solvents of a (meth)acrylic monomer with a macromonomer of the polyether (meth)acrylic type, where the said monomer and the said macromonomer are added in solution, copolymerisation in aqueous solution or in the presence of solvents of a (meth)acrylic monomer with a vinylic macromonomer having oxyalkylated hanging chains, where the said monomer and the said macromonomer are added in solution, esterification or amidification of a homopolymer or of a copolymer of (meth)acrylic acid, where the homopolymer and the copolymer of (meth)acrylic acid are added in solution, and then blended, and where the said blend is then dried before the esterification or amidification reactions begin.

The first and oldest of these methods consists in producing a copolymer of maleic anhydride with another hydrophobic monomer such as, notably, styrene (but also di-isobutylene, isobutylene or methyl vinyl ether), to which oxyalkylated lateral chains are grafted. The said copolymer of maleic anhydride with another hydrophobic monomer is initially synthesised in the presence of an organic solvent such as toluene or methyl ethyl ketone. The grafting of the oxyalkylated link is then made to the previously obtained copolymer, which is either in the dry state or in solution.

Document WO 97/39037 describes such polymers and indicates whether they can be used in cement compositions, notably to improve their fluidity. The method of synthesis associated with such polymers has the disadvantage that it uses organic solvents as indicated above, the elimination of which constitutes a costly stage, and the handling of which can be dangerous for the formulator and for the environment.

The second method of synthesis of comb polymers with a principal chain of a (meth)acrylic nature to which are attached polyoxyalkylated lateral groupings consists in copolymerising in solvent or aqueous media a (meth)acrylic monomer and a macromonomer of the (meth)acrylic polyether type, where the said monomer and the said macromonomer are initially added in solution.

As such, document US 2001 001797 describes a process for synthesis of comb polymers which can be used in the sector of cements, by polymerisation between an acrylic monomer and a macromonomer which is preferentially a (meth)acrylate of oxyethylene and/or of oxypropylene and/or of copolymers of oxyethylene and of oxypropylene in a random form or in the form of blocks, where the said monomer and the said macromonomer are added in the form of an aqueous solution. Such polymers enable the fluidity and shrinkage properties of the cement compositions in which they are used to be improved.

At the same time, document FR 2 861 399 describes comb polymers obtained in reverse suspension, by reaction between a monomer in an aqueous phase, which is acrylic acid, and a macromonomer in solvent phase, which is preferentially methoxy polyethylene glycol methacrylate. The resulting product is dried and obtained in the form of beads: these are used in cement compositions, the fluidity of which they are able to improve, whilst reducing their water content.

When the previously described synthesis of these polymers uses solvents, the skilled man in the art is once again faced with the problems of the danger posed by them, and of eliminating the said solvents. In addition, and more generally, the high price of the initial macromonomer of the (meth)acrylic polyether type constitutes a prohibitive element with a view to reducing production costs.

A third method of synthesis of comb polymers with a principal chain of a (meth)acrylic nature to which are attached polyoxyalkylated lateral groupings, consists in copolymerising in solvent or aqueous media a vinylic macromonomer having oxyalkylated hanging chains with a (meth)acrylic monomer, where the said monomer and the said macromonomer are initially added in the form of a solution.

Thus, document US 2004/235687 teaches the preparation of additives for cements, by copolymerisation between a (meth)acrylic monomer and a vinylic macromonomer having polyoxyalkylene groupings, where the said monomer and the said macromonomer are added either in aqueous solution, or in a solution containing organic solvents. The polymer obtained is then dried and used as a dispersing agent in hydraulic binders such as cements and mortars.

As has already been stated, when the synthesis of these polymers uses solvents it is not an acceptable solution for the skilled man in the art. Independently of this argument, this solution is not satisfactory for the skilled man in the art for another reason, given the price of the initial vinylic macromonomer.

There is a fourth method of synthesis of comb polymers notably having a principal chain of the (meth)acrylic nature, to which are attached polyoxyalkylated lateral groupings, which consists of the following process:

a) blending a solution of a homopolymer or of a copolymer of (meth)acrylic acid, with an alkoxy polyoxyalkylene glycol or an alkoxy polyoxyalkylene amine in a molten medium,
b) eliminating water from the blend,
c) then undertaking esterification of the homopolymer or of the copolymer of (meth)acrylic acid by alkoxy polyoxyalkylene glycol, or its amidification by alkoxy polyoxyalkylene amine, and eliminating the water resulting from the esterification reaction.

The Applicant indicates that the expression "produced in a molten medium" designates the said product present at a temperature higher than its melting point temperature.

Thus, document EP 1 016 638 describes dispersing agents for cement which can be obtained by esterification of a polycarboxylic polymer by polyalkylene glycol groupings. This document nonetheless gives a number of examples in which the said esterification reactions take place in a solvent which is tetrahydrofuran.

However, documents exist which teach esterification reactions of a polycarboxylic acid in water. Thus, document FR 2 776 285 describes the process of manufacture of a water-soluble dispersant for hydraulic binders, by esterification (catalysed by a base) of a homopolymer or of a copolymer of (meth)acrylic acid by means of a polyether containing a free hydroxyl group. The examples of this document clearly indicate that the products are introduced in the reactor in the liquid form, notably as an aqueous dispersion or in aqueous solution. In a first phase the polymer's solvation water is eliminated; subsequently, after the esterification reaction has taken place, the water generated by the said reaction is eliminated as this esterification reaction progresses. The dispersing agent then obtained improves the workability and uniformity of the cement compositions in which it is used.

Concerning document US 2003/148915, it describes polymers which are obtained by esterification of a homopolymer or of a copolymer of (meth)acrylic acid by alkylpolyalkylene glycol groupings. These two products are introduced in the form of aqueous solutions in the reactor where the esterification reaction takes place with elimination of water, the homopolymer or the copolymer of (meth)acrylic acid having been previously prepared by polymerisation in solution, in emulsion, or by precipitation.

Concerning the amidification reaction, document EP 1 577 327 describes dispersing or fluidifying agents for cements which are polymers obtained by reaction initially between (meth)acrylic acid and a monohydroxylated compound, and subsequently by reaction with a primary amine. The methacrylic acid and the monohydroxylated compound are introduced in the form of an aqueous solution, and the water is eliminated before the amidification reaction. Finally the end product is distilled, dried and then returned to an aqueous solution.

Consequently, the first three methods of synthesis of comb polymers having a principal chain of (meth)acrylic nature to which previously described polyoxyalkylated lateral groupings are attached, namely:
copolymerisation, in the presence of organic solvents, of maleic anhydride with another hydrophobic monomer such as, notably, styrene, followed by possible drying of the copolymer obtained, and then by its functionalisation by alkoxy polyoxyalkylene glycol or alkoxy polyoxyalkylene amine groupings,
copolymerisation in aqueous solution or in the presence of solvents of a (meth)acrylic monomer with a macromonomer of the polyether (meth)acrylic type, where the said monomer and the said macromonomer are added in solution,
copolymerisation in aqueous solution or in the presence of solvents of a (meth)acrylic monomer with a vinylic macromonomer having oxyalkylated hanging chains, where the said monomer and the said macromonomer are added in solution,
do not give the skilled man in the art satisfaction, since they use organic solvents, which are dangerous for the formulator and for the environment, and which are costly to eliminate, and/or because these methods use a macromonomer of high cost.

Thus, the skilled man in the art has at his disposal only those preparation methods which are based on esterification or amidification of a homopolymer or of a copolymer of (meth)acrylic acid, the products being blended in an aqueous solution, and the water subsequently being eliminated before the esterification or amidification reaction starts, and the water resulting from the esterification or amidification reaction then being eliminated during the reaction.

And, for the sake of productivity, the skilled man in the art is constantly seeking to improve the yield of his syntheses, and notably of the reactions which lead to the comb polymers which he is seeking to manufacture. Such efficacy may be defined, for example, as the reaction time necessary to obtain the said comb polymer with a given transformation rate, where this transformation rate is measured by an acid index according to a method of titration of the carboxylic groups: the dosed carboxylic groups are the groups which have not reacted.

Continuing its research along these lines, the Applicant has developed a new process for manufacture of comb polymers having a principal (meth)acrylic chain and polyoxyalkylated lateral groupings, characterised in that it consists in:
a) producing a solution containing at least one homopolymer of (meth)acrylic acid and/or at least one copolymer of (meth)acrylic acid with at least one other monomer,
b) drying the solution obtained in stage a), with a view to obtaining a homopolymer of (meth)acrylic acid in the dry state and/or a copolymer of (meth)acrylic acid with at least one other monomer in the dry state,
c) blending the product in the dry state obtained according to stage b) with at least one alkoxy polyoxyalkylene glycol in the molten state and/or at least one alkoxy polyoxyalkylene amine in the molten state and/or at least one alkylene oxide in the liquid or gaseous state,
d) then functionalising the homopolymer and/or copolymer of (meth)acrylic acid by:
esterification with at least one alkoxy polyoxyalkylene glycol,
and/or amidification with at least one alkoxy polyoxyalkylene amine,
or ethoxylation with at least one alkylene oxide.

Whether a liquid or gaseous state is concerned clearly depends on the temperature and pressure conditions to which the alkylene oxide in question is subject.

The Applicant indicates that the dry state of a polymer, in the case of the invention, is defined by a dry matter rate of over 80%, preferentially over 85%, very preferentially over 90%, and extremely preferentially over 95%, as measured by a desiccator-balance sold by the company METTLER-TOLEDO™ under the name HR83, where the measurement is made by drying at 150° C. until a mass loss of less than 1 mg is obtained over 30 seconds.

In a very surprising manner, such a process enables the efficacy of the functionalisation reaction to be improved appreciably (this efficiency having been defined above) compared to the prior art, in the case of the esterification and amidification reactions. As an example, document FR 2 776 285 of the prior art, previously cited in the present Application, describes in its example no 1 the synthesis of a dispersing agent which is a comb-type polymer with a polymethacrylic acid and polyethylene glycol methyl ether base, by a process in which the raw materials are added in the form of a solution, where the water is eliminated as the esterification reaction proceeds, and where the reaction time is equal to 6 hours, in order to obtain 40% esterification of the carboxylic functions. However, in a very surprising manner, as is notably illustrated by the examples of the present Application, the present invention enables such yield to be improved remarkably.

This means that in the process according to the invention which consists in introducing the homopolymer or the copolymer of (meth)acrylic acid in the dry form into the molten medium containing the groupings used for functionalisation, and then in undertaking the said functionalisation, the efficacy of the esterification or amidification reaction is greatly improved. In other words, the reaction time required to obtain the comb polymer with a given transformation rate is greatly reduced relative to this time measured for the esterification or amidification reactions induced according to the prior art, i.e. by blending in water of the homopolymer or copolymer of (meth)acrylic acid with the groupings used for the functionalisation, elimination of water from this blend, followed by functionalisation.

In addition, the process according to the invention allows ethoxylation of a homopolymer and/or of a copolymer of (meth)acrylic acid, which is another advantage of the present invention.

A first object of the invention is therefore a process for manufacture of comb polymers having a principal (meth) acrylic chain and polyoxyalkylated lateral groupings, characterised in that it consists in:
a) producing a solution containing at least one homopolymer of (meth)acrylic acid and/or at least one copolymer of (meth)acrylic acid with at least one other monomer,
b) drying the solution obtained in stage a), with a view to obtaining a homopolymer of (meth)acrylic acid in the dry state and/or a copolymer of (meth)acrylic acid with at least one other monomer in the dry state,
c) blending the product in the dry state obtained according to stage b) with at least one alkoxy polyoxyalkylene glycol in the molten state and/or at least one alkoxy polyoxyalkylene amine in the molten state and/or at least one alkylene oxide in the liquid or gaseous state,
d) then functionalising the homopolymer and/or copolymer of (meth)acrylic acid by:
esterification with at least one alkoxy polyoxyalkylene glycol,
and/or amidification with at least one alkoxy polyoxyalkylene amine,
or ethoxylation with at least one alkylene oxide.

The process according to the invention is also characterised in that the alkoxy polyoxyalkylene glycol is preferentially a methoxy polyoxyalkylene glycol, and very preferentially a methoxy polyoxyethylene glycol.

The process according to the invention is also characterised in that the alkoxy polyoxyalkylene amine is preferentially a methoxy polyoxyalkylene amine, and very preferentially a methoxy polyoxyethylene amine.

The process according to the invention is also characterised in that the alkylene oxide is preferentially an ethylene or propylene oxide, or their blends.

The process according to the invention is also characterised in that the homopolymer of (meth)acrylic acid and/or the copolymer of (meth)acrylic acid is obtained by processes of radical polymerisation in solution, in a direct emulsion, in the presence of catalytic systems and transfer agents, or again by processes of controlled radical polymerisation, and preferentially by nitroxide mediated polymerisation (NMP) or by cobaloximes, by atom transfer radical polymerisation (ATRP), by controlled radical polymerisation by sulphurated derivatives, chosen from among carbamates, dithioesters or trithiocarbonates (RAFT) or xanthates.

The process according to the invention is also characterised in that the other monomer of the copolymer of (meth)acrylic acid is chosen from among:
at least one anionic monomer with ethylenic unsaturation and with a monocarboxylic function which is preferentially acrylic or methacrylic acid, or their blends,
at least one monomer with ethylenic unsaturation, chosen from among at least one monomer with ethylenic unsaturation and a dicarboxylic function, and is preferentially chosen from among crotonic, itaconic or maleic acid, or again the anhydrides of carboxylic acids, and is preferentially maleic anhydride or chosen from among the monomers with ethylenic unsaturation and with a sulfonic function and is preferentially chosen from among 2-acrylamido-2-methyl-propane-sulfonic acid, vinyl sulfonic acid, or the salts of allyl ether sulfonate acid, styrene sulfonic acid, or indeed chosen from among the monomers with ethylenic unsaturation and with a phosphoric function, and is preferentially chosen from among vinyl phosphoric acid, ethylene glycol methacrylate phosphate, propylene glycol methacrylate phospate, ethylene glycol acyrlate phosphate, propylene glycol acrylate phospate and their ethoxylates, or indeed chosen from among the monomers with ethylenic unsaturation and a phosphonic function, and is preferentially vinyl phosphonic acid or, again, chosen from among vinylcaprolactone or vinylpyrrolidone, or their blends,
at least one non water-soluble monomer such as the alkyl acrylates or methacrylates, or their blends,
or the blends of these monomers.

The process according to the invention is also characterised in that the drying of the homopolymer and/or of the copolymer of (meth)acrylic acid produced according to stage b) is undertaken in a dryer by atomisation. However, the skilled man in the art will know how to use all the drying techniques well known by him with a view to drying the homopolymer and/or the copolymer during stage b).

The process according to the invention is also characterised in that the drying of the homopolymer and/or of the copolymer of (meth)acrylic acid accomplished according to stage b) is undertaken until a dry matter rate of over 80% is obtained, preferentially over 85%, very preferentially over 90%, and extremely preferentially over 95% of the weight of the said homopolymer and/or of the said copolymer, as measured by a desiccator-balance sold by the company METTLER-TOLEDO™ under the name HR83, where the measurement is made by drying at 150° C. until a mass loss of less than 1 mg in 30 seconds is obtained.

The process according to the invention is also characterised in that it includes a possible stage e), which follows stage d), consisting in putting into aqueous solution the product obtained at the end of stage d), and then, possibly, in totally or partially neutralising the said product by means of one or more neutralisation agents.

The process according to the invention is also characterised in that the neutralisation agents are chosen from among those having a monovalent neutralising function, and are then preferentially chosen from among the alkaline cations, and very preferentially chosen from among sodium, potassium, lithium or ammonium, or are preferentially chosen from among the primary, secondary, tertiary aliphatic and/or cyclic amines, and very preferentially chosen from among stearylamine, the ethanolamines (mono-, di-, triethanolamine), mono- and diethylamine, cyclohexylamine, methylcyclohexylamine, amino methyl propanol or morpholine, or are chosen from among the neutralisation agents having a divalent neutralising function, and are preferentially chosen from among the alkaline earth divalent cations, and are very preferentially chosen from among magnesium, calcium or zinc, or are chosen from among the neutralisation agents having a trivalent neutralising function, and preferentially consist of aluminium, or are chosen from among the neutralisation agents having a neutralising function higher than the trivalent function, or are chosen from among their blends.

A second object of the invention lies in the intermediate dry products which are the homopolymers of (meth)acrylic acid and/or the copolymers of (meth)acrylic acid with at least one other monomer, in the dry form, characterised in that they are obtained by the use of stages a) and b) of the process according to the invention.

These dry products are also characterised in that they have a dry matter rate of over 80%, preferentially over 85%, very preferentially over 90%, and extremely preferentially over 95% of their weight, as measured by a desiccator-balance sold by the company METTLER-TOLEDO™ under the name HR83, where the measurement is made by drying at 150° C. until a mass loss of less than 1 mg over 30 seconds is obtained.

A third object of the invention lies in the comb polymers, in the dry state, having a principal (meth)acrylic chain and polyoxyalkylated lateral groupings, characterised in that they are obtained by the process according to the present invention (i.e., clearly, by the process according to the present invention, but not using the optional stage e) of putting into an aqueous solution).

These comb polymers, in the dry state, are also characterised in that they have a dry matter rate of over 80%, preferentially over 85%, very preferentially over 90%, and extremely preferentially over 95% of their weight, as measured by a desiccator-balance sold by the company METTLER-TOLEDO™ under the name HR83, where the measurement is made by drying at 150° C. until a mass loss of less than 1 mg over 30 seconds is obtained.

A fourth object of the invention lies in the comb polymers, in aqueous solution, having a principal (meth)acrylic chain and polyoxyalkylated lateral groupings, characterised in that they are obtained by the process according to the present invention, in which stage e) of putting into an aqueous solution is used.

Another object of the present invention lies in the formulations containing mineral or organic matter, characterised in that they contain at least one comb polymer obtained by the process according to the present invention.

These formulations are also characterised in that the mineral matter is chosen from among natural or precipitated calcium carbonate, the dolomites, kaolin, talc, gypsum, lime, cement, magnesium, titanium dioxide, satin white, aluminium trioxide or again aluminium trihydroxide, the silicas, mica, barium carbonate and sulphate, and a blend of such forms of matter one with another, such as talc-calcium carbonate or calcium carbonate-kaolin blends, or again blends of calcium carbonate with aluminium trihydroxide or aluminium trioxide, or again blends with synthetic or natural fibres, or again co-structures of minerals such as talc-calcium carbonate or talc-titanium dioxide co-structures, or their blends, and preferentially in that it is a synthetic or natural calcium carbonate, the said natural calcium carbonate being preferentially chosen from among marble, calcite, chalk or their blends, or from among coloured mineral oxides, and in that the organic matter is chosen from among carbon black and the organic pigments, or their blends.

These formulations are also characterised in that they consist of plastics containing mineral or organic matter.

These formulations are also characterised in that they are aqueous formulations containing mineral or organic matter, where the said formulations are chosen from among aqueous dispersions or suspensions of mineral or organic matter, possibly containing a dispersing agent and/or a grinding aid agent and/or an anti-sedimentation agent and/or a thickening agent, or aqueous compositions with a hydraulic binder base, and are preferentially concretes, mortars, slags, cement slips, plasters, paper coatings, or paints, or cosmetic or detergent formulations, or textile formulations, or ceramic formulations, or drilling muds.

The following examples will enable the content of the invention to be better apprehended, without however limiting its scope.

EXAMPLES

Example 1

The purpose of this example is to illustrate the manufacture of comb polymers having a principal (meth)acrylic chain and polyoxyalkylated lateral groupings, using the process according to the invention.

More precisely, this example illustrates the variant according to which stage d) is an esterification of the principal chain by alkoxy polyoxyalkylene glycol groupings.

This example also illustrates the intermediate dry products obtained by the process according to the present invention, and also the comb polymers in the dry state obtained by the process according to the present invention.

Test no 1

This test illustrates the prior art.

In a 1-liter glass reactor fitted with a mechanical stirrer and heating of the oil bath type, the following is weighed:

- 350 g of methoxy polyethylene glycol of molecular mass equal to 5,000 g/mole, sold by the company CLARIANT™ under the name Polyglykol™ M 5000, in the molten form,
- 0.44 g of p-toluene sulfonic acid,
- 52.6 g of a homopolymer of methacrylic acid in solution in water at a rate of 30% by mass, and sold by the company COATEX™ under the name TP 941.

The acid index of the blend is determined by acido-basic dosing.

It is initially equal to 27.3 mg KOH/g.

This acid index corresponds to the presence of carboxylic groupings; the degree of progress of the reaction is given by the variation of this index.

The blend is then heated whilst stirring until it reaches 180° C. and the acid indices are measured periodically: the results are shown in table 1.

TABLE 1

| Heating time (hours) | Acid index (mg KOH/g) | Moles of acid consumed | Transformation rate/alcohol (%) |
|---|---|---|---|
| 1 | 24 | 0.02 | 28.6 |
| 2 | 22 | 0.03 | 42.8 |
| 4 | 19.8 | 0.0437 | 62.4 |
| 6 | 18 | 0.054 | 77.1 |
| 8 | 16.7 | 0.0618 | 88.3 |
| 11 | 16.6 | 0.062 | 88.6 |

Test no 2

This test illustrates the invention.

One starts, according to stage a) of the process according to the invention, by taking a solution of a homopolymer of methacrylic acid in solution in water at a rate of 30% by mass, and sold by the company COATEX™ under the name TP 941.

This solution is then dried, according to the following method, which corresponds to stage b) of the process according to the invention.

The solution of the homopolymer of methacrylic acid is introduced into a pre-heating chamber.

The said pre-heating chamber is then heated to a temperature of 85° C.

The product is then injected in the atomisation chamber of a dryer-atomiser through a nozzle, at a pressure of 60 bars.

Hot air at 300° C. is also injected into the atomisation chamber, which causes flash evaporation of water from the polymer solution.

The yield of this drying process is over 99%, i.e. the mass of dry polymer obtained after drying is at least equal to 99% of the mass of polymer contained in the initial aqueous solution.

The temperature of the polymer at output is equal to 50° C.

This drying operation is extremely rapid, lasting only a few seconds.

The polymer is then recovered in the form of a dry powder.

After this, according to stage c) of the process of the invention, in a 1-liter glass reactor fitted with a mechanical stirring mechanism and a heating mechanism of the oil bath type, the following is blended:

350 g of methoxy polyethylene glycol of molecular mass equal to 5,000 g/mole, sold by the company CLARIANT™ under the name Polyglykol™ M 5000, in the molten form, 0.44 g of p-toluene sulfonic acid, 15.8 g of the dry homopolymer of methacrylic acid obtained by the previously described drying method.

According to stage d) of the process of the invention, the reaction of esterification of the homopolymer of methacrylic acid by the methoxy polyethylene glycol then takes place.

The acid index of the blend is determined by acido-basic dosing.

The initial acid index is equal to 28.2 mg KOH/g.

This acid index corresponds to the presence of carboxylic groupings; the degree of progress of the reaction is given by the variation of this index.

The blend is then heated whilst stirring until it reaches 180° C. and the acid indices are measured periodically: the results are shown in table 2.

When it is left to cool the comb polymer according to the invention is indeed obtained, in the dry state.

TABLE 2

| Heating time (hours) | Acid index (mg KOH/g) | Moles of acid consumed | Transformation rate/alcohol (%) |
|---|---|---|---|
| 0.5 | 18.9 | 0.054 | 77.5 |
| 1 | 17.4 | 0.063 | 90 |
| 2 | 16.2 | 0.07 | 100 |

These results clearly demonstrate that the process according to the invention leads, much more rapidly than the process according to the prior art, to the sought comb polymer: indeed, the rate of transformation measured relative to the alcohol is equal to 100% in the case of test no 2 (invention), after only 2 hours' reaction, whereas it reaches only 42.8% in the case of test 1 (prior art) after 2 hours, and 88.3% after 8 hours' reaction.

Test no 3

This test illustrates the invention.

One starts, according to stage a) of the process according to the invention, by taking a solution of a homopolymer of methacrylic acid in solution in water at a rate of 30% by mass, and sold by the company COATEX™ under the name TP 941.

This solution is then dried, according to the following method, which corresponds to stage b) of the process according to the invention.

The polymer in solution described in test no 2 is introduced into an oven at 160° C. for 16 hours and the dry resin obtained then has the form of a brown solid.

After this, according to stage c) of the process of the invention, in a 1-liter glass reactor fitted with a mechanical stirring mechanism and a heating mechanism of the oil bath type, the following is blended:

350 g of methoxy polyethylene glycol of molecular mass equal to 5,000 g/mole, sold by the company CLARIANT™ under the name Polyglykol™ M 5000, in the molten form, 0.44 g of p-toluene sulfonic acid, 14 g of the homopolymer of methacrylic acid obtained by the previously described drying method.

The acid index of the blend is determined by acido-basic dosing.

The initial acid index is equal to 28.2 mg KOH/g.

This acid index corresponds to the presence of carboxylic groupings; the degree of progress of the reaction is given by the variation of this index.

The blend is then heated whilst stirring until it reaches 180° C. and the acid indices are measured periodically: the results are shown in table 3.

When it is left to cool the comb polymer according to the invention is indeed obtained, in the dry state.

TABLE 3

| Heating time (hours) | Acid index (mg KOH/g) | Moles of acid consumed | Transformation rate/alcohol (%) |
|---|---|---|---|
| 3 | 15 | 0.007 | 100 |

These results clearly demonstrate that the process according to the invention leads, much more rapidly than the process according to the prior art, to the sought comb polymer: indeed, the transformation rate measured relative to the alcohol is equal to 100% in the case of test no 3 (invention), after only 3 hours' reaction.

Example 2

The aim of this example is to illustrate the use of comb polymers manufactured using the process according to the invention, in formulations containing mineral matter consisting of mortars.

To accomplish this, a control mortar formulation is produced, by weighing in the bowl of a planetary mixer for mortar (Controlab) 518 g of CEM I 42.5 R HES GAURAIN cement and 1,350 g of EN 196-1 standardised sand.

These two compounds are then blended by stirring at 140 revolutions per minute for 30 seconds ($T_0$ $T_{30}$)

Immediately after the 30 seconds, 315 g of water is added in 30 seconds, whilst stirring is maintained at 140 revolutions per minute ($T_{30}$ to $T_{60}$).

After the water is added, stirring is maintained at 140 revolutions per minute for 60 seconds ($T_{60}$ to $T_{120}$).

Stirring is then stopped for 30 seconds ($T_{120}$ to $T_{150}$).

After this rest period, stirring is started again at 285 revolutions per minute, for 60 seconds ($T_{150}$ to $T_{210}$).

The mortar obtained is then transferred to a Abrahms minicone in order to determine the minimum shrinkage value. This minimum shrinkage value is determined when the minicone is raised, causing the slump of the mortar in the form of a circular cake. The value measured is the rounded average of 2 perpendicular diameters on the resulting mortar cake. The result is shown in table 1, where the tests are shown.

The formula of the control mortar (test no 3) above is repeated, this time including the 2 polymers for testing (tests no 4 and 5), which are previously blended in water, and where a test is undertaken for each of the polymers obtained according to tests no 1 and 2.

Since these polymers cause an appreciable reduction in viscosity, the quantity of water required is appreciably reduced, in order to obtain a spreading diameter close to that of the control. The composition of the mortar formulation is then 518 g of CEM I 42.5 R+HES GAURAIN cement, 1,350 g of EN 196-1 standardised sand, 270 g of water and 0.906 g of the polymer for testing.

The results obtained, together with the test parameters, are summarised in table 4.

TABLE 4

| Compounds in the formulation | Test n° 3 (control without polymer) | Test n° 4 (polymer of the prior art according to test n° 1) | Test n° 5 (polymer of the invention according to test n° 2) |
|---|---|---|---|
| CEM I 42.5 R HES GAURAIN cement | 518 g | 518 g | 518 g |
| EN 196-1 standardised sand | 1,350 g | 1,350 g | 1,350 g |
| Water | 315 g | 270 g | 270 g |
| Dry matter of the polymer for testing | — | 38.1% | 42.1% |
| Mass of polymer in the state which was used | 0 | 2.38 g | 2.15 g |
| Mass of dry polymer which was used | 0 | 0.906 g | 0.906 g |
| Average of the 2 spreading diameters | 33 cm | 28.75 cm | 28.5 cm |

The spreading diameters of the three polymers are almost identical, which demonstrates that the efficacy of the polymer according to the invention is not impaired by its method of synthesis, which is that of the process forming the subject of the present Application.

Example 3

The purpose of this example is to illustrate the manufacture of comb polymers having a principal chain with a (meth) acrylic copolymer base and polyoxyalkylated lateral groupings, using the process according to the invention. More precisely, this example illustrates the variant according to which stage d) is an esterification of the principal chain by alkoxy polyoxyalkylene glycol groupings. This example also illustrates the intermediate dry products obtained by the process according to the present invention, and also the comb polymers in the dry state obtained by the process according to the present invention.

Test no 6

This test illustrates the prior art.

In a 1-liter glass reactor fitted with a mechanical stirrer and heating of the oil bath type, the following is weighed:
  350 g of the same methoxy polyethylene glycol as that of test no 1, in the molten form,
  0.45 g of p-toluene sulfonic acid,
  60 g of a 25% by mass aqueous solution of an acrylic acid/methacrylic acid copolymer (10/90 as a molar %).

The blend is then heated whilst stirring to 180° C., and according to the method described in example 1.

Test no 6 b

This test illustrates the invention.

One begins, according to stage a) of the process according to the invention, by taking a solution of an acrylic acid/methacrylic acid copolymer (10/90 as a molar %).

This solution is then dried, according to the method described in test no 2, which corresponds to stage b) of the process according to the invention. The polymer is then recovered in the form of a dry powder.

After this, according to stage c) of the process of the invention, in a 1-liter glass reactor fitted with a mechanical stirring mechanism and a heating mechanism of the oil bath type, the following is blended:
  350 g of the same methoxy polyethylene glycol as that used in test no 2, in the molten form,
  0.45 g of p-toluene sulfonic acid,
  15.0 g of the copolymer of acrylic acid and of methacrylic acid obtained by the previously described drying method.

According to stage d) of the process of the invention, the reaction of esterification of the homopolymer of methacrylic acid by the methoxy polyethylene glycol then takes place.

The blend is then heated whilst stirring to 180° C. When it is left to cool the comb polymer according to the invention is indeed obtained, in the dry state.

In the case of tests no 6 and 6 b, the transformation rate as a % relative to alcohol (table 5) is determined as a function of time.

TABLE 5

| Test n° 6 | | Test n° 6 b | |
|---|---|---|---|
| Heating time (hours) | Transformation rate/alcohol (%) | Heating time (hours) | Transformation rate/alcohol (%) |
| 1 | 30.1 | 0 | 0 |
| 2 | 43.4 | 1 | 92.2 |
| 4 | 61.2 | 2 | 99.5 |
| 6 | 75.6 | 3 | 100 |
| 8 | 89.4 | — | — |

These results clearly demonstrate that the process according to the invention leads, much more rapidly than the process according to the prior art, to the sought comb polymer.

Test no 7

This test illustrates the prior art.

In a 1-liter glass reactor fitted with a mechanical stirrer and heating of the oil bath type, the following is weighed:
- 350 g of the same methoxy polyethylene glycol as that of test no 1, in the molten form,
- 0.42 g of p-toluene sulfonic acid,
- 80 g of a 20% by mass aqueous solution of a styrene/methacrylic acid copolymer (3/97 as a molar %).

The blend is then heated whilst stirring to 180° C., and according to the method described in example 1.

Test no 7 b

This test illustrates the invention.

One begins, according to stage a) of the process according to the invention, by taking an aqueous solution of a styrene/methacrylic acid copolymer (3/97 as a molar %).

This solution is then dried, according to the method described in test no 2, which corresponds to stage b) of the process according to the invention. The polymer is then recovered in the form of a dry powder.

After this, according to stage c) of the process of the invention, in a 1-liter glass reactor fitted with a mechanical stirring mechanism and a heating mechanism of the oil bath type, the following is blended:
- 350 g of the same methoxy polyethylene glycol as that used in test no 2, in the molten form,
- 0.42 g of p-toluene sulfonic acid,
- 20.0 g of the copolymer of acrylic acid and of methacrylic acid obtained by the previously described drying method.

According to stage d) of the process of the invention, the reaction of esterification of the homopolymer of methacrylic acid by the methoxy polyethylene glycol then takes place.

The blend is then heated whilst stirring to 180° C. When it is left to cool the comb polymer according to the invention is indeed obtained, in the dry state.

In the case of tests no 7 and 7 b, the transformation rate as a % relative to alcohol (table 6) is determined as a function of time.

TABLE 6

| Test n° 7 | | Test n° 7 b | |
|---|---|---|---|
| Heating time (hours) | Transformation rate/alcohol (%) | Heating time (hours) | Transformation rate/alcohol (%) |
| 1 | 32.1 | 0 | 0 |
| 2 | 44.0 | 1 | 93.4 |
| 4 | 59.8 | 2 | 100 |
| 6 | 74.2 | — | — |
| 8 | 90.1 | — | — |

These results clearly demonstrate that the process according to the invention leads, much more rapidly than the process according to the prior art, to the sought comb polymer.

Test no 8

This test illustrates the prior art.

In a 1-liter glass reactor fitted with a mechanical stirrer and heating of the oil bath type, the following is weighed:
- 350 g of the same methoxy polyethylene glycol as that of test no 1, in the molten form,
- 0.44 g of p-toluene sulfonic acid,
- 80 g of a 30% by mass aqueous solution of an itaconic acid/methacrylic acid copolymer (5/95 as a molar %).

The blend is then heated whilst stirring to 180° C., and according to the method described in example 1.

Test no 8 b

This test illustrates the invention.

One begins, according to stage a) of the process according to the invention, by taking an aqueous solution of an itaconic acid/methacrylic acid copolymer (5/95 as a molar %).

This solution is then dried, according to the method described in test no 2, which corresponds to stage b) of the process according to the invention. The polymer is then recovered in the form of a dry powder.

After this, according to stage c) of the process of the invention, in a 1-liter glass reactor fitted with a mechanical stirring mechanism and a heating mechanism of the oil bath type, the following is blended:
- 350 g of the same methoxy polyethylene glycol as that used in test no 2, in the molten form,
- 0.44 g of p-toluene sulfonic acid,
- 24.0 g of the copolymer of acrylic acid and of methacrylic acid obtained by the previously described drying method.

According to stage d) of the process of the invention, the reaction of esterification of the homopolymer of methacrylic acid by the methoxy polyethylene glycol then takes place.

The blend is then heated whilst stirring to 180° C. When it is left to cool the comb polymer according to the invention is indeed obtained, in the dry state.

In the case of tests no 8 and 8 b, the transformation rate as a % relative to alcohol (table 7) is determined as a function of time.

TABLE 7

| Test n° 8 | | Test n° 8 b | |
|---|---|---|---|
| Heating time (hours) | Transformation rate/alcohol (%) | Heating time (hours) | Transformation rate/alcohol (%) |
| 1 | 31.7 | 0 | 0 |
| 2 | 45.6 | 1 | 92.8 |
| 4 | 62.3 | 2 | 100 |
| 6 | 77.9 | — | — |
| 8 | 94.3 | — | — |

These results clearly demonstrate that the process according to the invention leads, much more rapidly than the process according to the prior art, to the sought comb polymer.

Example 4

The purpose of this example is to illustrate the manufacture of comb polymers having a principal chain with a (meth) acrylic copolymer base and polyoxyalkylated lateral groupings, using the process according to the invention. More precisely, this example illustrates the variant according to which stage d) is an esterification or an amidification. This example also illustrates the intermediate dry products obtained by the process according to the present invention, and also the comb polymers in the dry state obtained by the process according to the present invention and their use in the manufacture of mortars.

Test no 9

This test illustrates the prior art. It corresponds to the synthesis, according to the same method as that described in test no 1, of a comb polymer consisting of:
- 80% as a molar percentage of methacrylic acid,
- 20% as a molar percentage of methoxy polyethylene glycol of molecular mass equal to 750 g/mole.

Test no 9 b

This test illustrates the invention. It corresponds to the synthesis, according to the same method as that described in test no 2, of a comb polymer consisting of:

80% as a molar percentage of methacrylic acid,
20% as a molar percentage of methoxy polyethylene glycol of molecular mass equal to 750 g/mole.

Test no 10

This test illustrates the prior art. It corresponds to the synthesis, according to the same method as that described in test no 1, of a comb polymer consisting of:

85% as a molar percentage of methacrylic acid,
15% as a molar percentage of methoxy polyethylene glycol of molecular mass equal to 2,000 g/mole.

Test no 10 b

This test illustrates the invention. It corresponds to the synthesis, according to the same method as that described in test no 2, of a comb polymer consisting of:

85% as a molar percentage of methacrylic acid,
15% as a molar percentage of methoxy polyethylene glycol of molecular mass equal to 2,000 g/mole.

Test no 11

This test illustrates the prior art. It corresponds to the synthesis, according to the same method as that described in test no 1, of a comb polymer consisting of:

85% as a molar percentage of methacrylic acid,
15% as a molar percentage of methoxy polyethylene glycol of molecular mass equal to 2,000 g/mole.

Test no 11 b

This test illustrates the invention. It corresponds to the synthesis, according to the same method as that described in test no 2, of a comb polymer consisting of:

85% as a molar percentage of methacrylic acid,
15% as a molar percentage of methoxy polyethylene glycol of molecular mass equal to 2,000 g/mole.

Test no 12

This test illustrates the prior art. It corresponds to the synthesis, according to the same method as that described in test no 1, of a comb polymer consisting of:

85% as a molar percentage of methacrylic acid,
15% as a molar percentage of methoxy polyethylene glycol amine of molecular mass equal to 2,000 g/mole.

Test no 12 b

This test illustrates the invention. It corresponds to the synthesis, according to the same method as that described in test no 2, with the difference that stage c) of the process according to the invention is an amidification and not an esterification, of a comb polymer consisting of:

80% as a molar percentage of methacrylic acid,
20% as a molar percentage of methoxy polyethylene glycol amine of molecular mass equal to 2,000 g/mole.

All the polymers corresponding to tests no 10 to 12 and 10 b to 12 b were tested in mortar formulations, using the same protocol as that described in example 2. The corresponding results are shown in table 8.

TABLE 8

| Compounds in the formulation | 10 | 10 b | 11 | 11 b | 12 | 12 b |
|---|---|---|---|---|---|---|
| CEM I 42.5 R HES GAURAIN cement | 518 g | 518 g | 518 g | 518 g | 518 g | 518 g |
| EN 196-1 standardised sand | 1,350 g | 1,350 g | 1,350 g | 1,350 g | 1,350 g | 1,350 g |
| Water | 220 g | 220 g | 220 g | 220 g | 220 g | 220 g |
| Mass of dry polymer which was used | 0.906 g | 0.906 g | 0.906 g | 0.906 g | 0.906 g | 0.906 g |
| Average of the 2 spreading diameters | 23.2 cm | 23.1 cm | 2.16 cm | 26.3 cm | 11.3 cm | 11.4 cm |

The spreading diameters of the three polymers are almost identical, which demonstrates that the efficacy of the polymer according to the invention is not impaired by its method of synthesis, which is that of the process forming the subject of the present Application.

The invention claimed is:

1. A process, comprising:
   drying a solution comprising at least one homopolymer of (meth)acrylic acid, at least one copolymer of (meth)acrylic acid and at least one other monomer, or a combination thereof, to obtain a homopolymer of (meth)acrylic acid in the dry state, a copolymer of (meth)acrylic acid with at least one other monomer in the dry state, or a combination of a homopolymer of (meth)acrylic acid and a copolymer of (meth)acrylic acid and at least one other monomer in the dry state;
   blending the product in the dry state obtained from said drying with at least one alkylene oxide in the liquid or gaseous state, and, optionally, at least one alkoxy polyoxyalkylene glycol in the molten state, at least one alkoxy polyoxyalkylene amine in the molten state, or a combination thereof,
   then functionalizing the homopolymer of (meth)acrylic acid, a copolymer of (meth)acrylic acid, or a combination thereof, by
      ethoxylation with at least one alkylene oxide, and, optionally, at least one of
      esterification with at least one alkoxy polyoxyalkylene glycol and
      amidification with at least one alkoxy polyoxyalkylene amine,
   thereby obtaining a comb polymer having a principal (meth)acrylic chain and polyoxyalkylated lateral groupings,
   wherein said drying is carried out in a dryer by atomization to obtain a dry matter rate of over 80%.

2. A process according to claim 1, wherein the alkoxy polyoxyalkylene glycol comprises a methoxy polyoxyalkylene glycol.

3. A process according to claim 1, wherein the alkoxy polyoxyalkylene amine comprises a methoxy polyoxyalkylene amine.

4. A process according to claim 1, wherein the alkylene oxide comprises an ethylene oxide, a propylene oxide, or a blend thereof.

5. A process according to claim 1, wherein the homopolymer of (meth)acrylic acid, the copolymer of (meth)acrylic acid with at least one other monomer, or both is obtained by solution radical polymerization, direct emulsion radical polymerization, a radical polymerization carried out in the presence of a catalyst or a transfer agent, controlled radical polymerization, atom transfer radical polymerization, controlled radical polymerization in the presence of a sulphurated compound comprising a carbamate, a dithioether, a thiocarbonate, or a xanthate.

6. A process according to claim 1, wherein the other monomer of the copolymer of (meth)acrylic acid is at least one monomer selected from the group consisting of:
an anionic monomer having ethylenic unsaturation and a monocarboxylic functional group,
a monomer having an ethylenic unsaturation and a dicarboxylic functional group, an anhydride of a monomer having an ethylenic unsaturatation and an a dicarboxylic acid functional group,
a non water-soluble monomer, and
a combination thereof.

7. A process according to claim 1, wherein said drying to obtain a dry matter rate of over 95%, of the weight of said homopolymer or of said copolymer, as measured by a desiccator-balance, where the measurement is made by drying at 150° C. until a mass loss of less than 1 mg in 30 seconds is obtained.

8. A process according to claim 1, further comprising:
making an aqueous solution of the comb polymer obtained from said functionalizing and, optionally, partially or totally neutralizing the comb polymer by adding a neutralizing agent to said aqueous solution.

9. A process according to claim 8,
wherein said neutralizing agent comprises at least one member selected from the group consisting of sodium, potassium, lithium, ammonium, a primary amine, a secondary amine, a tertiary amine, an aliphatic amine, a cyclic amine, magnesium, calcium, zinc, and aluminum.

10. A process according to claim 1, wherein the alkoxy polyoxyalkylene glycol comprises a methoxy polyoxyethylene glycol.

11. A process according to claim 1, wherein the alkoxy polyoxyalkylene amine comprises a methoxy polyoxyethylene amine.

12. A process according to claim 1, wherein the homopolymer of (meth)acrylic acid, the copolymer of (meth)acrylic acid with at least one other monomer, or both is obtained by nitroxide mediated polymerization.

13. A process according to claim 1, wherein the other monomer of the copolymer of (meth)acrylic acid is at least one monomer selected from the group consisting of acrylic acid, methacrylic acid, a combination of acrylic acid and methacrylic acid, crotonic acid, itaconic acid, maleic acid, maleic anhydride, 2-acrylamido-2-methyl-propane-sulfonic acid, vinyl sulfonic acid, styrene sulfonic acid, vinyl phosphoric acid, ethylene glycol methacrylate phosphate, propylene glycol methacrylate phospate, ethylene glycol acyrlate phosphate, propylene glycol acrylate phosphate, an ethoxylate thereof, a vinyl phosphonic acid, a blend of vinyl phosphonic acids, an alkyl acrylate, an alkyl, methacrylate, a combination of alkyl acrylate and alkyl methacrylate, and a combination thereof.

14. A process according to claim 8, wherein said neutralizing agent comprises at least one member selected from the group consisting of sodium, potassium, lithium, ammonium, magnesium, calcium, zinc, and aluminum, stearylamine, mono-ethanolamines, di-ethanolamines, tri-ethanolamine, mono-ethylamine, di-ethylamine, cyclohexylamine, methylcyclohexylamine, amino methyl propanol, morpholine, and a combination thereof.

15. A process according to claim 1, which consists of said drying, blending, and functionalizing.

\* \* \* \* \*